United States Patent
Reynolds

(10) Patent No.: US 7,600,879 B1
(45) Date of Patent: Oct. 13, 2009

(54) MOTOR VEHICLE WITH A REAR SEAT VIEWING SYSTEM

(75) Inventor: Brian Reynolds, Plain City, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/178,857

(22) Filed: Jul. 24, 2008

(51) Int. Cl.
  *B60R 1/08* (2006.01)
  *B60R 1/12* (2006.01)

(52) U.S. Cl. .................. 359/881; 359/841; 359/844; 359/872; 248/477; 248/486; 297/185

(58) Field of Classification Search ............... 359/841, 359/844, 881, 872; 297/185, 188.04–188.07; 248/475.1–487
See application file for complete search history.

(56) References Cited

U.S. PATENT DOCUMENTS

| | | | | |
|---|---|---|---|---|
| 593,043 | A * | 11/1897 | Cochran et al. ............. | 359/872 |
| 642,162 | A * | 1/1900 | Seabury et al. .............. | 312/226 |
| 752,551 | A * | 2/1904 | Hessler ........................ | 34/90 |
| 878,255 | A * | 2/1908 | Thomson ..................... | 312/226 |
| 1,338,582 | A * | 4/1920 | Morris et al. ............... | 297/185 |
| 1,455,225 | A * | 5/1923 | Ross ........................... | 296/37.15 |
| 1,780,938 | A * | 11/1930 | Passis ......................... | 362/131 |
| 1,965,788 | A * | 7/1934 | Akiyoshi .................... | 297/146 |
| 2,532,853 | A * | 12/1950 | Parry .......................... | 297/185 |
| 2,811,083 | A * | 10/1957 | Simjian ....................... | 359/881 |
| 4,681,366 | A * | 7/1987 | Lobanoff ................. | 297/188.06 |
| 4,687,305 | A * | 8/1987 | Harris et al. ................ | 359/863 |
| 4,702,572 | A * | 10/1987 | Cossey ....................... | 359/876 |
| 4,733,956 | A | 3/1988 | Erickson | |
| 4,902,118 | A * | 2/1990 | Harris ......................... | 359/871 |
| 5,103,347 | A * | 4/1992 | Lumbra et al. .............. | 359/871 |
| 5,453,882 | A * | 9/1995 | Westman .................... | 359/855 |
| 5,576,898 | A * | 11/1996 | Rubin ........................ | 359/841 |
| 6,120,155 | A * | 9/2000 | Brennan et al. ............. | 359/857 |
| 6,305,810 | B1 | 10/2001 | Mercado | |
| 6,354,708 | B1 | 3/2002 | Monahan et al. | |
| 6,412,965 | B2 * | 7/2002 | Menefee ..................... | 359/881 |
| 6,478,435 | B2 | 11/2002 | Monahan et al. | |
| 6,491,403 | B2 * | 12/2002 | Edgar ......................... | 359/872 |
| 6,773,123 | B1 | 8/2004 | Hatchett | |
| 6,822,673 | B1 * | 11/2004 | Kelly .......................... | 348/61 |
| 6,997,567 | B1 | 2/2006 | Caruso | |
| 7,104,661 | B2 | 9/2006 | Kane et al. | |
| 2008/0100996 | A1 * | 5/2008 | Wang ........................ | 361/681 |

FOREIGN PATENT DOCUMENTS

DE 3637772 A1 * 5/1988
DE 19932298 A1 * 1/2000

(Continued)

*Primary Examiner*—Alessandro Amari
*Assistant Examiner*—Mark Consilvio
(74) *Attorney, Agent, or Firm*—Plumsea Law Group, LLC

(57) ABSTRACT

A rear seat viewing system for a motor vehicle is disclosed. The rear seat viewing system includes a mirror attached to a mirror mounting device. The mirror mounting device may retract the mirror into an exterior surface of a rear seat in a stowed position and extend the mirror outside of the exterior surface of the rear seat in an employed position. A linkage mechanism attached to the mirror mounting device can allow horizontal and vertical adjustment of the mirror.

24 Claims, 14 Drawing Sheets

FOREIGN PATENT DOCUMENTS

| | | | | |
|---|---|---|---|---|
| FR | 2850335 | A1 | * | 7/2004 |
| JP | 2000085472 | A | * | 3/2000 |
| JP | 2002-127793 | | | 5/2002 |
| JP | 2002234392 | A | * | 8/2002 |
| JP | 2003312348 | A | * | 11/2003 |
| KR | 97036864 | A | * | 7/1997 |
| KR | 97036868 | A | * | 7/1997 |
| KR | 2004042686 | A | * | 5/2004 |
| WO | WO 02/94613 | A1 | * | 11/2002 |

* cited by examiner

MOTOR VEHICLE WITH A REAR SEAT VIEWING SYSTEM

BACKGROUND OF THE INVENTION

1. Field of the Invention

The present invention relates to motor vehicles and in particular to a rear seat viewing system.

2. Description of Related Art

Kelly (U.S. Pat. No. 6,822,673) is directed to a child monitoring system. Kelly teaches a mirror that is coupled to a headrest such that the headrest includes a monitoring position and a normal position. Kelly also teaches a cover member that obscures the surface of the mirror.

Rubin (U.S. Pat. No. 5,576,898) teaches an optical system for viewing the rear seat of a vehicle. Rubin teaches a forward facing mirror that is mounted with the headliner in a fixed or adjustable manner. Rubin also teaches a friction hinge for moving the mirror from a substantially flush position with the headliner to an extending position projecting from the headliner.

Cossey (U.S. Pat. No. 4,702,572) teaches a system for viewing an infant in the rear seat of a vehicle. Cossey teaches a spring loaded mount bracket that can be mounted to back support portion of a rear seat. The mount bracket can include a mirror that is connected to the bracket by a vertical sleeve. The mirror can rotate about a ball joint connection between the mirror and the vertical sleeve.

SUMMARY OF THE INVENTION

A motor vehicle with a rear seat viewing system is disclosed. The term "motor vehicle" as used throughout the specification and claims refers to any moving vehicle that is capable of carrying one or more human occupants and is powered by any form of energy. The term motor vehicle includes, but is not limited to cars, trucks, vans, minivans, SUV's, motorcycles, scooters, boats, personal watercraft, and aircraft.

In one aspect, the invention provides rear seat viewing system for a motor vehicle, comprising: a rear seat including an exterior surface; a mirror attached to a mirror mounting device; the mirror mounting device being configured to adjust the mirror between a stowed position and an employed position; and where the mirror is disposed within the exterior surface of the rear seat in the stowed position and where the mirror is disposed outside of the exterior surface of the rear seat in the employed position.

In another aspect, the mirror is oriented towards a front compartment of the motor vehicle in the employed position.

In another aspect, the mirror is configured to tilt.

In another aspect, the mirror can be adjusted in a vertical direction.

In another aspect, the mirror can be adjusted in a horizontal direction.

In another aspect, the mirror mounting device includes a linkage mechanism.

In another aspect, the invention provides a rear seat viewing system for a motor vehicle, comprising: a rear seat including an exterior surface; a mirror attached to a mirror mounting device, the mirror mounting device being configured to retract the mirror into the rear seat; the mirror mounting device including a linkage mechanism; and where the linkage mechanism provides for horizontal and vertical adjustment of the mirror.

In another aspect, the mirror mounting device includes a base portion.

In another aspect, the linkage mechanism attaches the base portion to the mirror.

In another aspect, the mirror can pivot with respect to the linkage mechanism.

In another aspect, the linkage mechanism can pivot with respect to the base portion.

In another aspect, the linkage mechanism includes at least one extending portion.

In another aspect, the linkage mechanism includes a first extending portion and a second extending portion and wherein the first extending portion can pivot with respect to the second extending portion.

In another aspect, the invention provides a rear seat viewing system for a motor vehicle, comprising: a mirror attached to a mirror mounting device; a rear seat including a cavity that is open on an upper portion of an exterior surface of the rear seat; and where the mirror mounting device is configured to retract the mirror into the cavity in a stowed position of the mirror.

In another aspect, the cavity includes a set of notches that are configured to engage the mirror mounting device.

In another aspect, the set of notches are configured to engage a base portion of the mirror mounting device.

In another aspect, the base portion can be manually squeezed and thereby retracted into the cavity.

In another aspect, the mirror mounting device can be configured to automatically retract the mirror into the stowed position.

In another aspect, the mirror mounting device can be configured to automatically extend the mirror to an employed position.

In another aspect, the mirror mounting system is also retracted into the cavity when the mirror is in a stowed position.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

Figure 1:
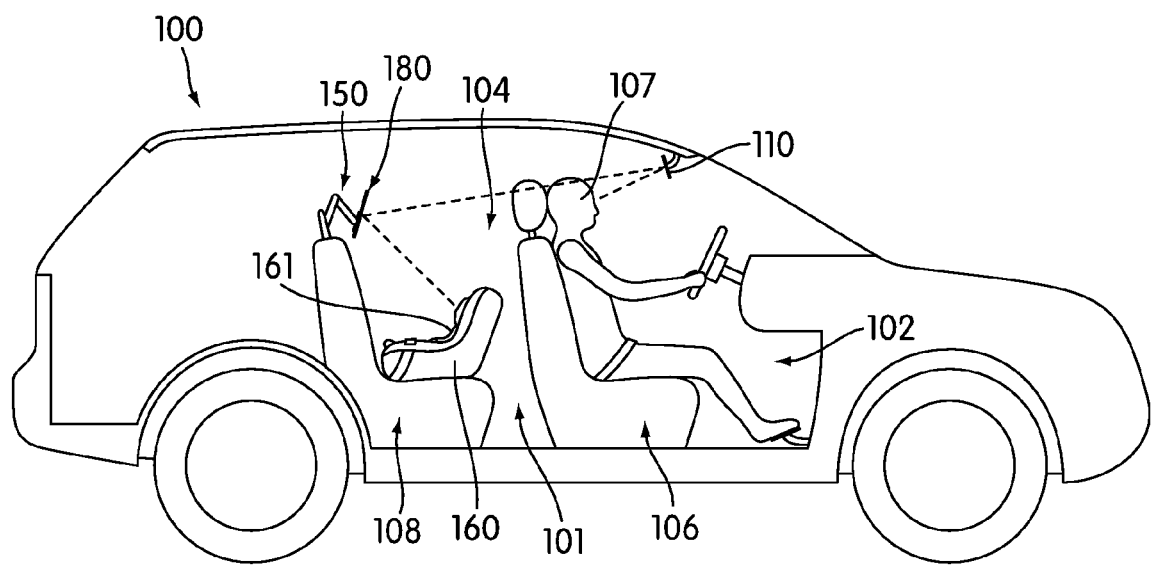
FIG. 1 is a preferred embodiment of a motor vehicle interior configured with a rear seat viewing system.

FIG. 1 is a cross sectional view of a preferred embodiment of motor vehicle 100. Generally, motor vehicle 100 could be any type of motor vehicle, including, but not limited to cars, trucks, vans, minivans, SUV's, motorcycles, scooters, boats, personal watercraft, and aircraft. In this preferred embodiment, motor vehicle 100 is a sedan.

In the current embodiment, motor vehicle 100 includes motor vehicle interior 101. Motor vehicle interior 101 may comprise front compartment 102 and rear compartment 104. Preferably, front compartment 102 includes driver seat 106 and a passenger seat. Likewise, rear compartment 104 includes rear seat 108. In some embodiments, rear seat 108 may include additional rear seats. Although only one row of rear seats are shown in this embodiment, in other embodiments, motor vehicle interior 101 may include multiple rows of rear seats.

Preferably, motor vehicle interior 101 includes provisions to allow a driver to see objects behind motor vehicle 100. In the current embodiment, motor vehicle interior 101 includes rear-view mirror 110. Generally, rear-view mirror 110 may be disposed in any portion of motor vehicle interior 101 that allows a driver to view objects behind motor vehicle 100. In some cases, rear-view mirror 110 may be mounted to a dashboard or front console of motor vehicle 100. In other cases, rear-view mirror 110 may be affixed to a roof lining of motor vehicle interior 101. In the current embodiment, rear-view mirror 110 is affixed to a front windshield of motor vehicle 100. Using this configuration, driver 107 seated in driver seat 106 may see the area behind motor vehicle 100 with rear-view mirror 110.

For clarity, only some components of motor vehicle interior 101 are shown in this schematic illustration. It should be understood that in other embodiments, additional components may be included in motor vehicle interior 101. For example, in some embodiments, additional mirrors may be mounted within motor vehicle interior 101 to view the area behind motor vehicle 100.

In some cases, a child restraint system may be secured to a seat within a motor vehicle. The term "child restraint system" as used throughout this detailed description and in the claims refers to any system that includes provisions for holding an infant or child securely within a motor vehicle. Often, a child restraint system configured for an infant may be secured to a rear seat of a motor vehicle in a rearward-facing position to provide maximum protection.

In the current embodiment, child restraint system 160 is secured to rear seat 108 within motor vehicle interior 101. In other embodiments, child restraint system 160 may be secured to other seats within rear compartment 104. Generally, child restraint system 160 may be secured to rear seat 108 in any manner. For example, in some cases, child restraint system 160 may be secured to rear seat 108 using a seatbelt. In other embodiments, child restraint system 160 could be secured to rear seat 108 using other fasteners.

Typically, child restraint system 160 is configured to accommodate an infant. In order to provide greater protection to an infant, child restraint system 160 is attached in a rearward-facing position to rear seat 108. With this arrangement, infant 161 may be secured and protected during a front on collision.

Preferably, a motor vehicle with a rearward-facing child restraint system may include provisions for a driver to view an infant or child within the child restraint system. In particular, the motor vehicle may include provisions that allow the driver to see the face of the infant so that the driver can monitor the child. Using just a rearview mirror, the driver may only be able to see the back of a rearward-facing child restraint system.

A motor vehicle may be configured with a rear seat viewing system. The term "rear seat viewing system" as used throughout this detailed description and in the claims refers to any system that includes provisions for allowing a driver to view an infant or child within a rearward-facing child restraint system disposed on a seat in a rear compartment. In this preferred embodiment, motor vehicle interior 101 includes rear seat viewing system 150. Generally, rear seat viewing system 150 may be configured to view an infant or child within a rearward-facing child restraint system attached to any rear seat in rear compartment 104 of motor vehicle 100. In this embodiment, rear seat viewing system 150 is configured to provide a view of infant 161 within child restraint system 160 attached to rear seat 108.

In order to view infant 161 within child restraint system 160, driver 107 may look in rear-view mirror 110 and locate mirror 180 of rear seat viewing system 150. Preferably, mirror 180 is adjustable and configured to reflect an image of infant 161. With this arrangement, driver 107 may view infant 161 through rear-view mirror 110 and mirror 180 of rear seat viewing system 150.

In previous designs, mirrors fastened to child restraint systems or rear seats of motor vehicles have allowed drivers to view infants or children within rearward-facing child restraint systems. However, mirrors that are not integrated within a motor vehicle interior may be difficult to adjust. Furthermore, mirrors fastened within a motor vehicle interior may become dislodged during normal operations of the motor vehicle. Preferably, a rear seat viewing system may be integrated within a motor vehicle interior to provide ease of adjustment.

Figure 2:
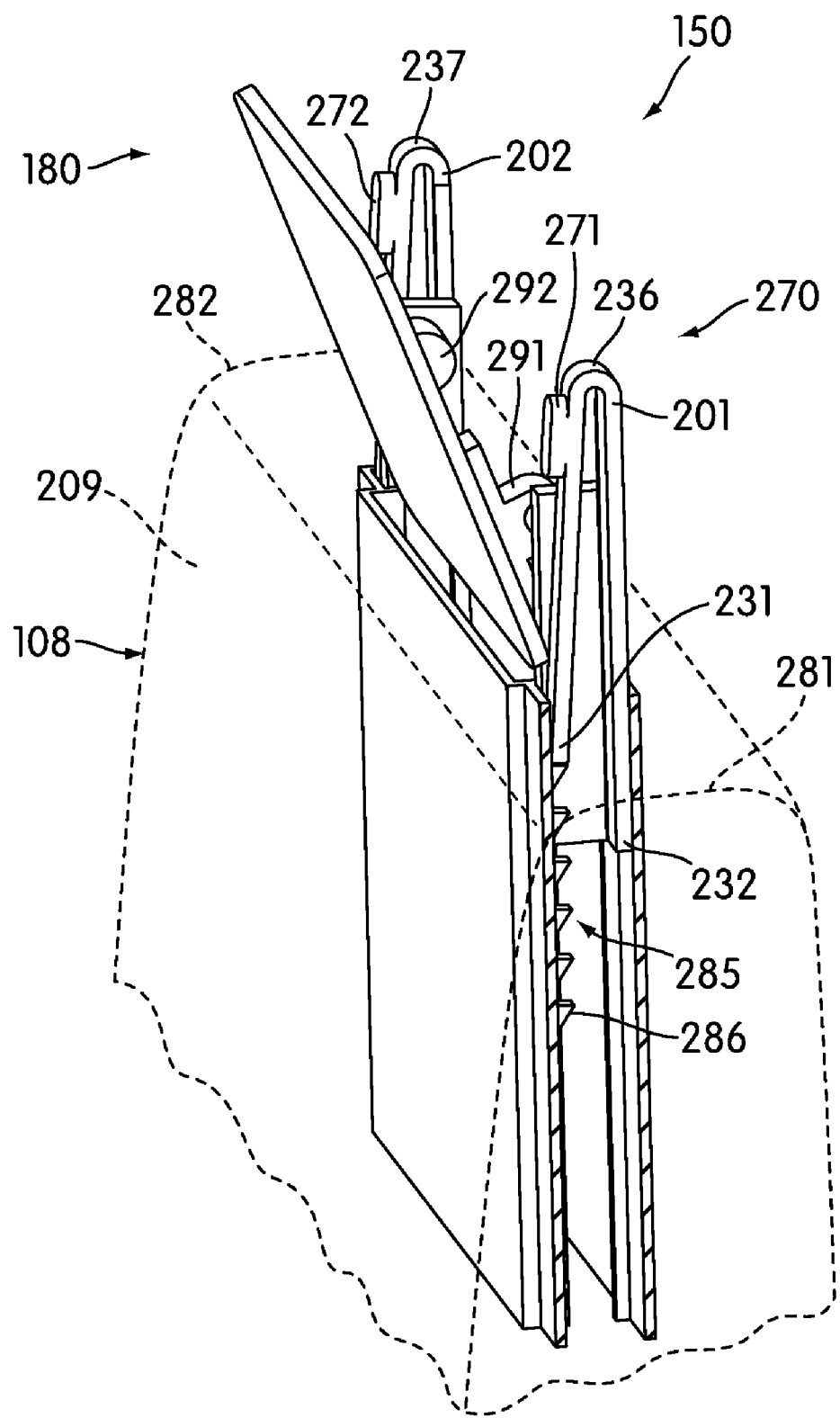
FIG. 2 is an assembled view of a preferred embodiment of a rear seat viewing system.
Figure 3:
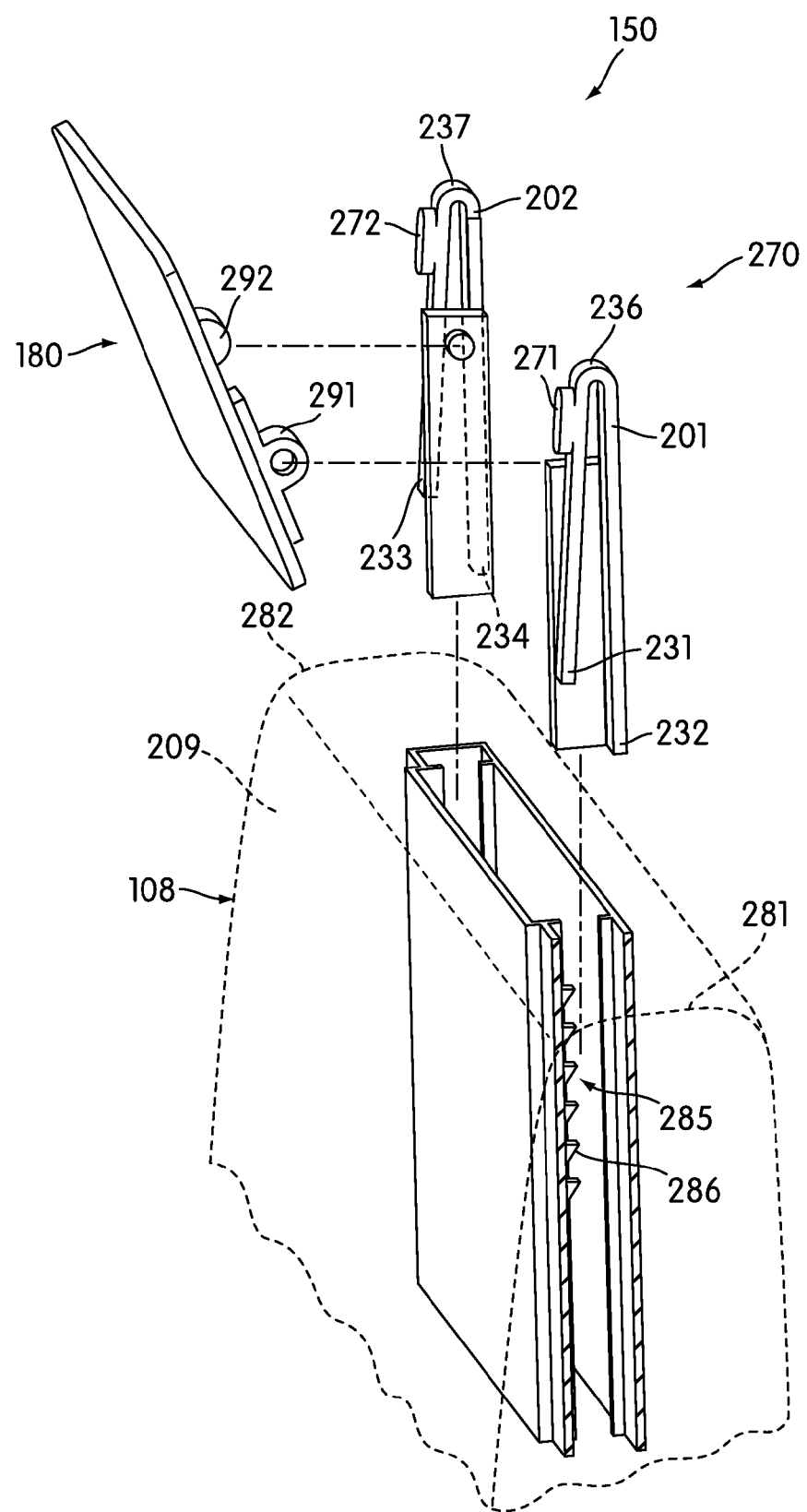
FIG. 3 is an exploded isometric view of a preferred embodiment of a rear seat viewing system.

FIGS. 2-3 illustrate an enlarged view of a preferred embodiment of rear seat viewing system 150. In this embodiment, rear seat viewing system 150 is associated with rear seat 108. However, in other embodiments, rear seat viewing system 150 may be associated with any rear seat in a rear compartment of a motor vehicle. In particular, rear seat viewing system 150 could be associated with a right rear seat, a left rear seat, a central rear seat or any other type of rear seat.

As previously discussed, rear seat viewing system 150 includes mirror 180. Generally, mirror 180 may be any type of mirror configured in any shape and size. Examples of shapes include, but are not limited to, rounded shapes, rectangular shapes, oval shapes, regular polygonal shapes, irregular shapes or any other type of shape. In this preferred embodiment, mirror 180 is configured in a generally rectangular shape.

In some embodiments, mirror 180 could include various provisions for increasing the visibility of an infant. In some cases, mirror 180 may include magnification. In other cases, mirror 180 may include illumination. In still other cases, mirror 180 could include both magnification and illumination.

Mirror 180 may be attached to rear seat 108 using mirror mounting device 270. In this embodiment, mirror mounting device 270 includes first base portion 201 and second base portion 202. First base portion 201 may be associated with first side 281 of rear seat 108. Likewise, second base portion 202 may be associated with second side 282 of rear seat 108.

Referring to the exploded view illustrated in FIG. 3, first base portion 201 and second base portion 202 are configured with substantially similar U-shapes. In particular, first base portion 201 includes first rounded region 236 disposed between first end 231 and second end 232. Similarly, second base portion 202 includes second rounded region 237 disposed between third end 233 and fourth end 234.

In some embodiments, first base portion 201 may also include first mounting portion 259 that is configured to attach to mirror 180. Likewise, second base portion 202 may include second mounting portion 269 that is configured to attach to mirror 180. In other embodiments, however, first base portion 201 and second base portion 202 may attach directly to mirror 180 without the use of a mounting portion.

Generally, a mirror mounting device may be integrated with a rear seat in any manner. In some embodiments, a mirror mounting device may be integrated within an exterior surface of a rear seat. The term "exterior surface" as used throughout this detailed description and in the claims refers to all outer surfaces of a rear seat including, but not limited to, top surfaces, side surfaces, forward surfaces and rearward surfaces. In a preferred embodiment, a mirror mounting device may be integrated within a cavity disposed within an exterior surface of a rear seat.

In other embodiments, a mirror mounting device may mounted onto an exterior surface of a rear seat. In other words, the mirror mounting device may not be integrated within the rear seat, but could be attached to an exterior surface of the rear seat. In some cases, a mirror mounting device can be mounted to the back of a rear seat at a factory during the manufacturing process. In other cases, a mirror mounting device can be mounted to the back of a rear seat after the manufacturing process. For example, a mirror mounting device can be installed on a rear seat as a dealer option after a motor vehicle has been manufactured.

In the current embodiment, mirror mounting device 270 is integrated with rear seat 108 at cavity 285 disposed within exterior surface 209 as seen in FIG. 2. Cavity 285 could be any type of pocket or open region within rear seat 108 that is configured to receive and retain mirror mounting device 270 and mirror 180. In this embodiment, cavity 285 is bounded by cavity exterior walls 299. In some embodiments, while cavity 285 is generally hollow, the portion of rear seat 108 disposed between exterior surface 209 of rear seat 108 and cavity exterior walls 299 may be filled with some type of padding or other material.

In some embodiments, first base portion 201 and second base portion 202 may be inserted within cavity 285. Specifically, first end 231 and second end 232 of first base portion 201 may slide into receiving portions within cavity 285. Similarly, third end 233 and fourth end 234 of second base portion 202 may slide into receiving portions within cavity 285. Preferably, this arrangement allows mirror mounting device 270 to be integrated with a portion of rear seat 108.

Generally, mirror mounting device 270 may be attached to mirror 180 in any manner that allows for the adjustment of mirror 180. In this embodiment, first rounded region 236 of first base portion 201 may be attached to mirror 180 at first pivoting connection 291 as seen in the assembled view of FIG. 2. Similarly, second rounded region 237 of second base portion 202 may be attached to mirror 180 at second pivoting connection 292. Generally, first pivoting connection 291 and second pivoting connection 292 may be any type of connection that allows mirror 180 to tilt. With this arrangement, mirror 180 may be disposed between first base portion 201 and second base portion 202 of mirror mounting device 270. Furthermore, mirror 180 may be integrated with rear seat 108 in this manner.

Generally, any type of pivoting connection could be used for first pivoting connection 291 and second pivoting connection 292. In particular, a rear seat viewing system could include a single type of pivoting connection or multiple different types of pivoting connections. In some embodiments, a pivoting connection may be comprised of rounded projections and holes. In other embodiments, a pivoting connection could include ball joint connections that pivot in multiple directions. In still other embodiments, a pivoting connection could comprise screws and/or bolts and holes to receive the screws and/or bolts.

In some embodiments, a pivoting connection may be manually loosened and/or tightened. For example, the pivoting connection could comprise a screw that may be manually loosened in order to adjust the connection and then tightened again to maintain the adjustment. In other embodiments, a pivoting connection may be a frictional pivoting connection that allows the position of a mirror mounting device to be easily adjusted and maintained.

Referring to FIG. 3, first pivoting connection 291 preferably comprises first receiving hole 295 that is associated with a portion of mirror 180. Preferably, first receiving hole 295 is configured to receive first rounded projection 297 of first mounting portion 259. With this arrangement, first receiving hole 295 can rotate with respect to first rounded projection 297 to provide a pivoting motion for mirror 180 with respect to first base portion 201. Likewise, second pivoting connection 292 preferably comprises second receiving hole 287 that is also associated with a portion of mirror 180. Preferably, second receiving hole 287 is configured to receive second rounded projection 289 of second mounting portion 269 to provide a pivoting motion for mirror 180 with respect to second base portion 202. In some embodiments, first rounded projection 297 and second rounded projection 289 may have generally cylindrical shapes that are configured to form a frictional connection with first receiving hole 295 and second receiving hole 287, respectively. Throughout the remaining embodiments discussed in this detailed description, it should be understood that each of the pivoting connections discussed may also comprise receiving holes that are configured to rotate about rounded projections.

In some embodiments, a mirror mounting device may include additional components to provide horizontal and/or vertical adjustment of a mirror. The term "horizontal" as used throughout this detailed description and in the claims refers to the longitudinal direction between a front compartment and a rear compartment of a motor vehicle interior. Likewise, the term "vertical" as used throughout this detailed description and in the claims refers to the direction between a ceiling and floor of a motor vehicle interior. Typically, adjustment in a horizontal and/or vertical direction may be desirable in order to reflect an image of an infant or child within a child restraint system forward to a mirror disposed in a front compartment of a motor vehicle. In a preferred embodiment, a mirror mounting device may be configured with a linkage mechanism that provides horizontal as well as vertical adjustment of a mirror.

Figure 4:
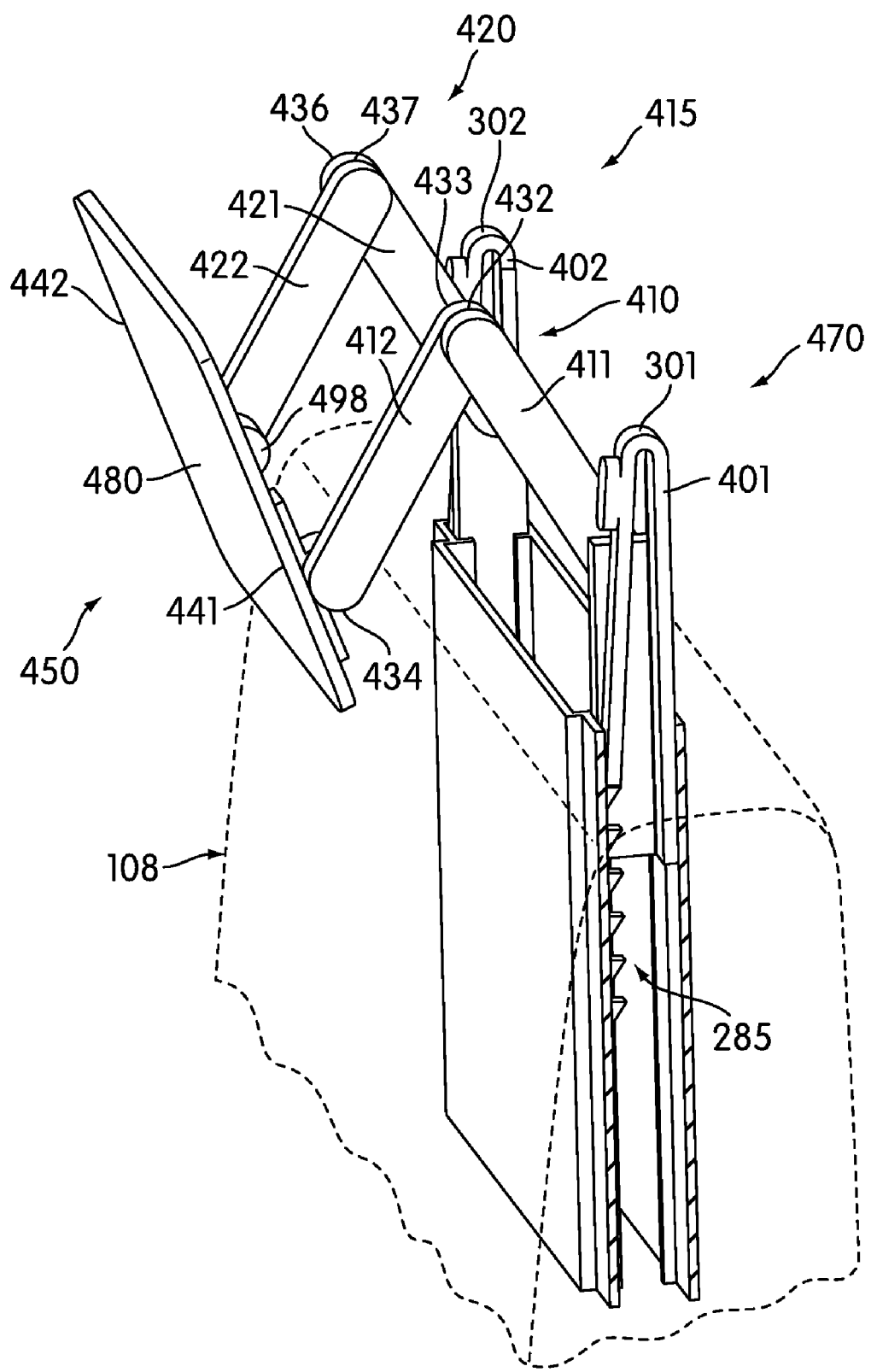
FIG. 4 is an assembled view of a preferred embodiment of a rear seat viewing system with a linkage mechanism.
Figure 5:
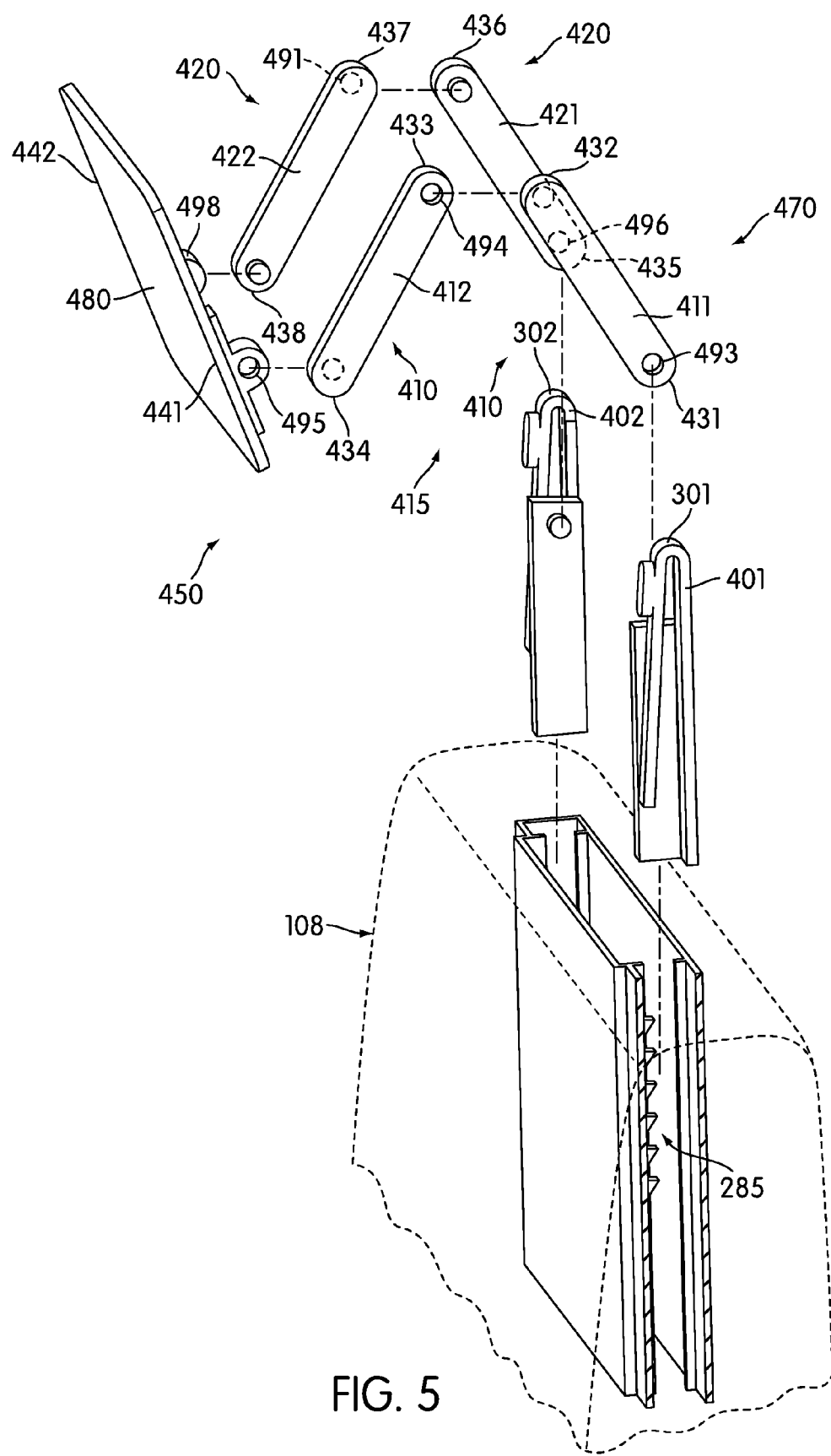
FIG. 5 is an exploded isometric view of a preferred embodiment of a rear seat viewing system with a linkage mechanism.

FIGS. 4-5 illustrate a preferred embodiment of rear seat viewing system 450 disposed within rear seat 108. In this preferred embodiment, the integration of mirror mounting device 470 of rear seat viewing system 450 within cavity 285 of rear seat 108 is substantially similar to the previous embodiment. In particular, mirror mounting device 470 includes first base portion 401 and second base portion 402 that are configured in a substantially similar manner as the previous embodiment.

In this preferred embodiment, rear seat viewing system 450 includes linkage mechanism 415. Linkage mechanism 415 is configured to attach first base portion 401 and second base portion 402 of mirror mounting device 470 to mirror 480. Specifically, linkage mechanism includes two sets of linkage arms to attach mirror 480 to first base portion 401 and second base portion 402. First linkage arm 410 may be associated with first base portion 401 and first side 441 of mirror 480. In a similar manner, second linkage arm 420 may be associated with second base portion 402 and second side 442 of mirror 480.

Generally, a linkage arm may include any number of extending portions in order to attach a mirror to base portions of a mirror mounting device. In some embodiments, a linkage arm may include a single extending portion. In other embodiments, a linkage arm may include multiple extending portions. In a preferred embodiment, a linkage arm may include two extending portions.

In the current embodiment, first linkage arm 410 and second linkage arm 420 each include two extending portions. In particular, first linkage arm 410 of linkage mechanism 415 includes first proximal extending portion 411 and first distal extending portion 412. First proximal extending portion 411 includes first end 431 and second end 432. Similarly, first distal extending portion includes third end 433 and fourth end 434. In a similar manner, second linkage arm 420 includes second proximal extending portion 421 and second distal extending portion 422. Likewise, second proximal extending portion 421 is configured with fifth end 435 and sixth end 436. In addition, second distal extending portion 422 includes seventh end 437 and eighth end 438.

Referring to FIGS. 4-5, first linkage arm 410 of linkage mechanism 415 attaches first base portion 401 to first side 441 of mirror 480. Specifically, first end 431 of first proximal extending portion 411 attaches to first mounting portion 301 of first base portion 401 via third pivoting connection 493. Furthermore, second end 432 of first proximal extending portion 411 attaches to third end 433 of first distal extending portion 412 through fourth pivoting connection 494. Finally, fourth end 434 of first distal extending portion 412 connects to fifth pivoting connection 495 disposed on first side 441 of mirror 480. In this manner, first linkage arm 410 may attach first base portion 401 to first side 441 of mirror 480.

In a similar manner, second linkage arm 420 of linkage mechanism 415 attaches second base portion 402 to second side 442 of mirror 480. Referring to the exploded view illustrated in FIG. 5, fifth end 435 of second proximal extending portion 421 fastens to second mounting portion 302 of second base portion 402 via sixth pivoting connection 496. In addition, sixth end 436 of second proximal extending portion 421 may attach to seventh end 437 of second distal extending portion 422 via seventh pivoting connection 491. Finally, eighth end 438 of second distal extending portion 422 attaches to eighth pivoting connection 498 disposed on second side 442 of mirror 480. With this arrangement, second linkage arm 420 may attach second base portion 402 to second side 442 of mirror 480.

With this configuration, linkage mechanism 415 preferably allows a driver to adjust mirror 480 in a horizontal as well as vertical direction. Referring to the assembled view in FIG. 4, linkage mechanism 415 allows mirror 480 to be adjusted horizontally by pulling mirror 480 forward or pushing mirror 480 rearward. In addition, mirror 480 may be pulled or pushed upward or downward to adjust mirror 480 vertically. In this manner, a driver may fine tune the adjustment of mirror 480 in order to reflect an image of an infant or child within a child restraint system into a forward compartment of a motor vehicle interior.

Preferably, an integrated rear seat viewing system for a motor vehicle may be stowed when not in use. In some cases, a mirror mounting device of a rear seat viewing system may include provisions to retract a mirror into an exterior surface of a rear seat in order to stow the mirror when not in use. In the stowed position, a mirror mounting device and a mirror may be hidden from view. From this stowed position, the mirror mounting device may extend the mirror outside of the exterior surface of the rear seat into an employed position. While in the employed position, the rear seat viewing system may provide a view of an infant or child within a rearward-facing child restraint system. With this configuration, the mirror mounting system may adjust the mirror between a stowed position and an employed position.

FIGS. 6-13 illustrate an exemplary embodiment of the adjustment of mirror 480 of rear seat viewing system 450 between a stowed position and an employed position. It should be understood that the process illustrated in these Figures is intended to be exemplary.

As previously discussed, a mirror mounting device may be configured to adjust a mirror between a stowed position and an employed position. This may be accomplished by applying an actuating force to a rear seat viewing system in order to signal the mirror mounting device to adjust the mirror between a stowed and an employed position. Generally, the actuating force may be supplied by various sources. In some embodiments, a rear seat viewing system may be associated with a button or lever that may electronically control the mirror mounting device to adjust the mirror in an employed position or a stowed position. In this exemplary embodiment, a motor vehicle occupant may apply a force by pulling or pushing a portion of a mirror mounting device in order to adjust the mirror between an employed position and a stowed position.

Although rear seat viewing system 450 is configured with linkage mechanism 415, the process of adjusting between a stowed position and an employed position may be substantially similar in a rear seat viewing system without a linkage mechanism. For example, mirror 180 of rear seat viewing system 150 illustrated in FIGS. 2-3 may be adjusted between a stowed and an employed position in a substantially similar manner as the process illustrated in FIGS. 6-13.

Figure 6:
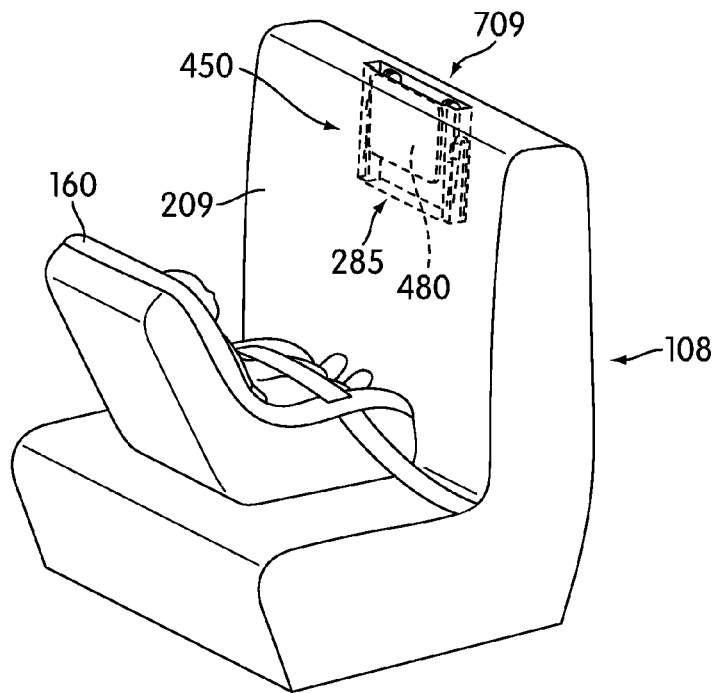
FIG. 6 is an isometric view of an exemplary embodiment of a mirror of a rear seat viewing system configured in a stowed position.

Referring to FIG. 6, mirror 480 is disposed within exterior surface 209 of rear seat 108 in the stowed position. For illustrative purposes, rear seat viewing system 450 is shown in phantom in cavity 285 within exterior surface 209. In some cases, a portion of rear seat viewing system 450 may be visible on top portion 709 of exterior surface 209. In other cases, a flap or cover of some kind may be applied to close cavity 285.

Figure 7:
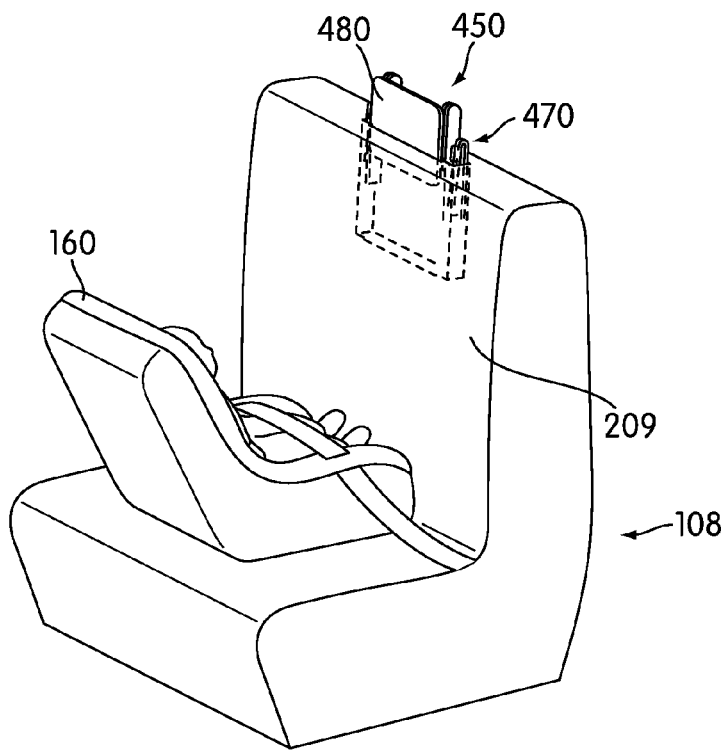
FIG. 7 is an isometric view of an exemplary embodiment of a mirror of a rear seat viewing system adjusting to an employed position.
Figure 8:
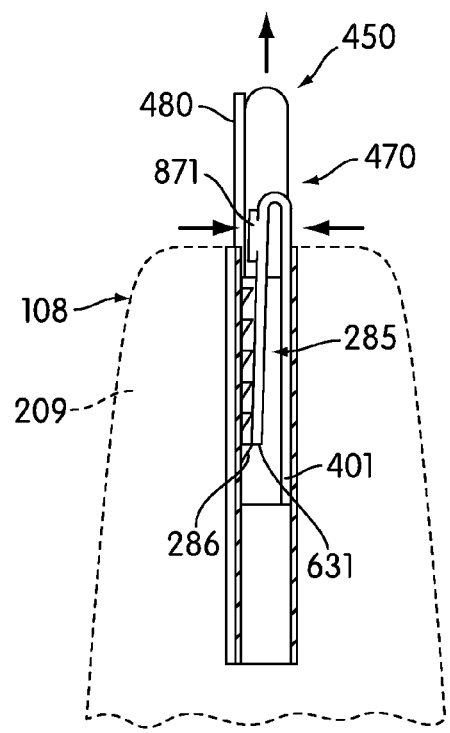
FIG. 8 is an enlarged view of an exemplary embodiment of a mirror of a rear seat viewing system adjusting to an employed position.

In order to view child restraint system 160 disposed on rear seat 108, mirror 480 may be adjusted to an employed position. Referring to FIGS. 7-8, a motor vehicle occupant may pull mirror mounting device 470 upward to adjust mirror 480 to an employed position. In particular, as seen in FIG. 8, a motor vehicle occupant may compress first tab 871 of first base portion 401 and a second tab of second base portion 402, not visible in these Figures, to move mirror mounting device 470 and mirror 480 upward to assume an employed position. For the sake of clarity, second base portion 402 of mirror mounting device 470 is not shown in FIGS. 7-8. However, it should be understood that second base portion 402 may be configured in a substantially similar manner as first base portion 401 to adjust mirror 480 to an employed position. By pulling mirror mounting device 470 upward, a portion of mirror 480 is revealed outside of exterior surface 209 of rear seat 108 as mirror 480 is adjusted to an employed position.

In some cases, notches 286 disposed within cavity 285 may assist a motor vehicle occupant in moving mirror mounting device 470 to a position that disposes mirror 480 in an employed position. Specifically, the triangular shape of notches 286 may provide a smooth surface for first base portion 401 to ascend as a motor vehicle occupant pulls and compresses first tab 871 of first base portion 401. In other words, a motor vehicle occupant may pull first base portion 401 upward and slide first end 631 of first base portion 401 over notches 286. Furthermore, first end 631 of first base portion 401 may be prevented from slipping downward by a substantially flat portion of the triangular shape of notches 286. With this arrangement, a motor vehicle occupant may adjust mirror mounting device 470 to a position that disposes mirror 480 in an employed position outside of exterior surface 209.

Figure 9:
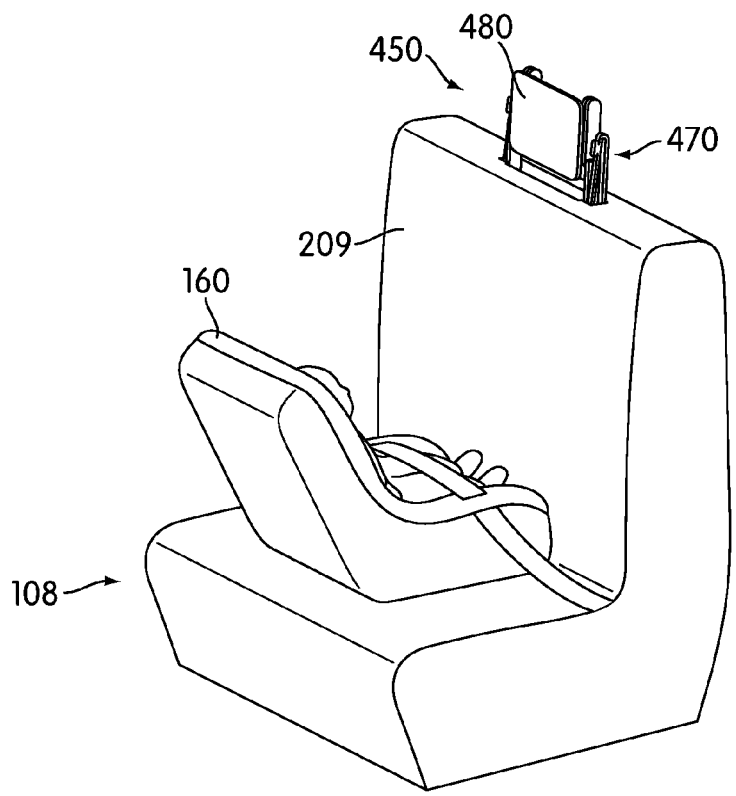
FIG. 9 is an isometric view of an exemplary embodiment of a mirror of a rear seat viewing system in an employed position.
Figure 10:
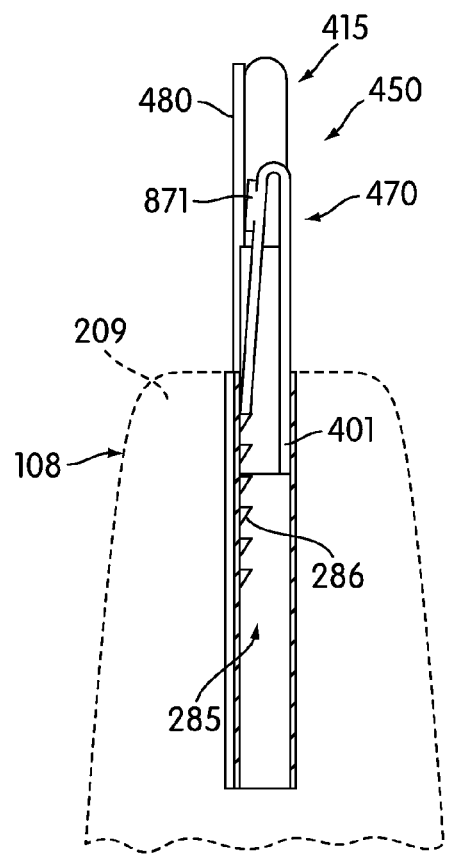
FIG. 10 is an enlarged view of an exemplary embodiment of a mirror of a rear seat viewing system in an employed position.

Referring to FIGS. 9-10, mirror mounting device 470 is configured in a position that completes the adjustment of mirror 480 in an employed position. In particular, mirror mounting device 470 is configured at an adequate vertical position within cavity 285 to dispose mirror 480 outside of exterior surface 209 of rear seat 108. At this point, as mirror mounting device 470 adjusts mirror 480 to an employed position, linkage mechanism 415 may remain compacted within first base portion 401 and second base portion 402.

Figure 11:
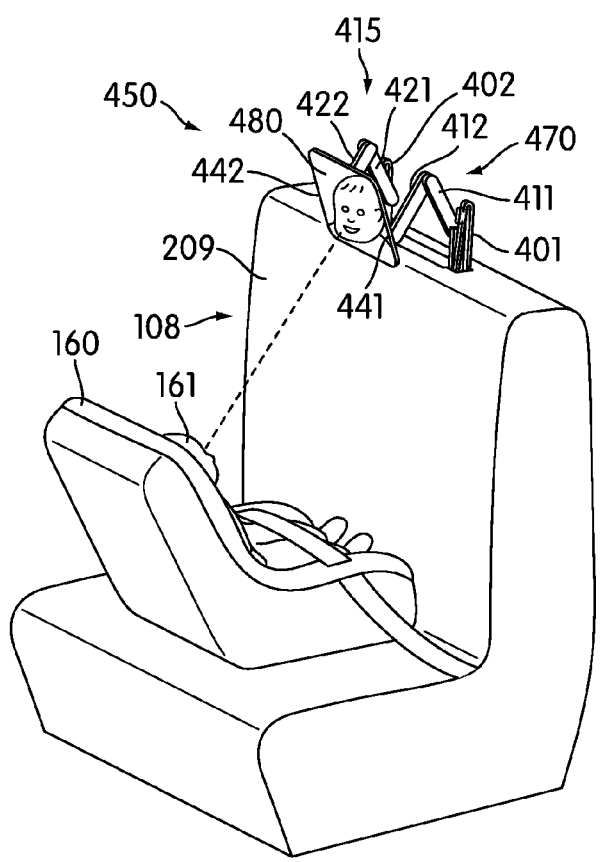
FIG. 11 is an isometric view of an exemplary embodiment of an adjustment of a linkage mechanism of a rear seat viewing system.

Following the adjustment of mirror 480 to an employed position, mirror 480 may require additional adjustment in a horizontal and/or vertical direction to view infant 161 within child restraint system 160. Referring to FIG. 11, linkage mechanism 415 may be extended to provide horizontal and vertical adjustment of mirror 480. Specifically, first proximal extending portion 411 and first distal extending portion 412 may be adjusted to direct first side 441 of mirror 480 toward infant 161. In a similar manner, second proximal extending portion 421 and second distal extending portion 422 may be adjusted to direct second side 442 of mirror 480 toward infant 161. With this arrangement, mirror 480 may reflect an image of infant 161 within child restraint system 160 to allow a driver to view infant 161.

Figure 12:
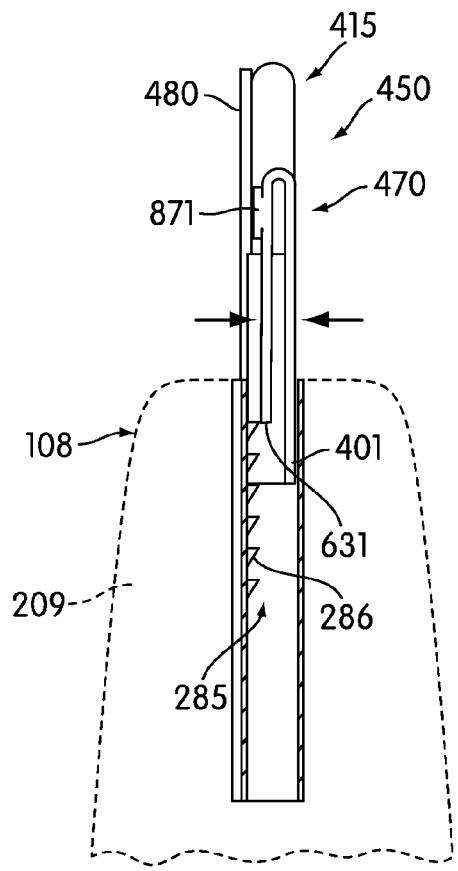
FIG. 12 is an enlarged view of an exemplary embodiment of a mirror of a rear seat viewing system adjusting to a stowed position.

Preferably, mirror 480 may be configured in a stowed position when mirror 480 is no longer needed. Referring to FIG. 12, linkage mechanism 415 is collapsed and disposed against mirror 480. In addition, mirror mounting device 470 may be configured to retract mirror 480 within exterior surface 209 of rear seat 108. In this exemplary embodiment, this may be accomplished by a motor vehicle occupant compressing first base portion 401 at first tab 871. Preferably, this compression will be sufficient to ensure that first end 631 of first base portion 401 is not encumbered by notches 286. For the sake of clarity, second base portion 402 is not visible in this Figure. However, it should be understood that second base portion 402 may be compressed in a substantially similar manner to retract mirror 480 to a stowed position.

Figure 13:
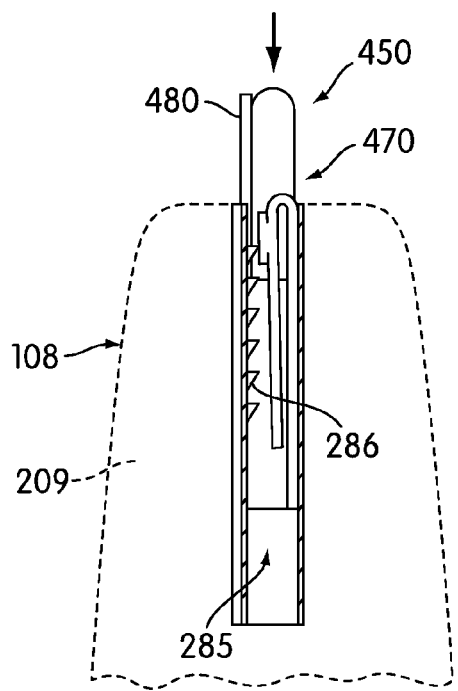
FIG. 13 is an enlarged view of an exemplary embodiment of a mirror of a rear seat viewing system adjusting to a stowed position.

By compressing first base portion 401 and second base portion 402, mirror mounting device 470 may be configured to retract mirror 480 within rear seat 108. Specifically, a motor vehicle occupant may apply a downward force to push mirror mounting device 470 within cavity 285 as seen in FIG. 13. In this manner, mirror 480 may be retracted and stowed within exterior surface 209 of rear seat 108. In some cases, notches 286 within cavity 285 may assist in locking mirror mounting device 470 in place within cavity 285. In the stowed position, mirror 480 may be disposed within exterior surface 290 of rear seat 108 and not visible to a driver or another motor vehicle occupant. Preferably, this arrangement allows mirror 480 to be available for use when needed and stowed when not needed.

A rear seat viewing system can include provisions to cover a cavity of a rear seat when the mirror is in a stowed position. In some embodiments, a rear seat viewing system can include a lid to cover a cavity. With this arrangement, a lid can provide a finished appearance for an exterior surface when the rear seat viewing system is stowed.

FIGS. 17-22 illustrate an alternative embodiment of an adjustment of mirror 480 of rear seat viewing system 450 from a stowed position to an employed position. It should be understood that the process illustrated in these Figures is intended to be exemplary. Furthermore, the process of adjusting a mirror from a stowed position to an employed position may be substantially similar in a rear seat viewing system without a linkage mechanism.

Figure 17:
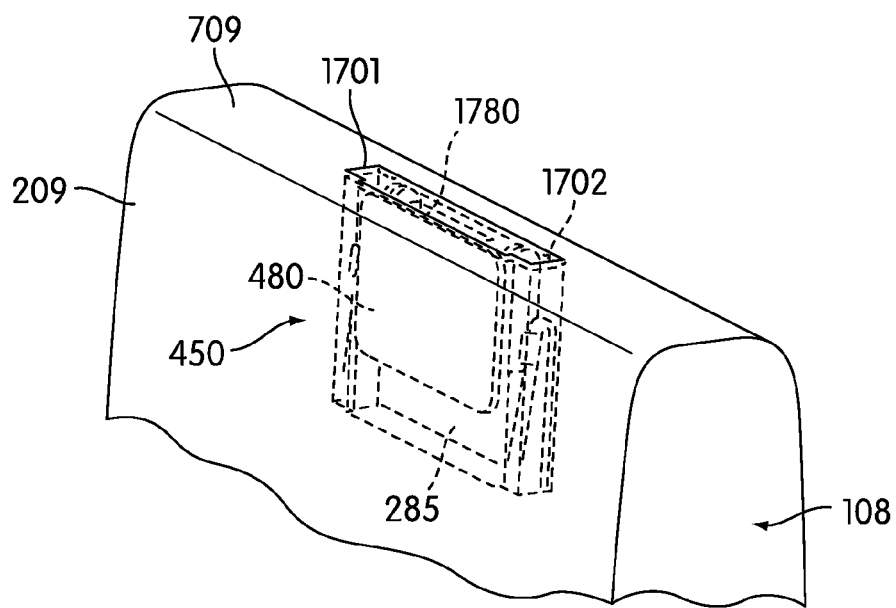
FIG. 17 is an isometric view of a preferred embodiment of a rear seat viewing system in a stowed position.

Referring to FIG. 17, rear seat viewing system 450, shown in phantom for purposes of illustration, is in a stowed position. In this stowed position, rear seat viewing system 450 is disposed in cavity 285 within exterior surface 209 of rear seat 108. In particular, rear seat viewing system 450 is stowed so that no portion protrudes from cavity 285, as illustrated in the cross sectional view in FIG. 18.

In this embodiment, exterior surface 209 includes lid 1701 disposed adjacent to cavity 285, as seen in FIG. 17. Preferably, lid 1701 is configured with a shape that covers cavity 285 on top portion 709. In other embodiments, lid 1701 can be configured with a shape larger than cavity 285. With this arrangement, lid 1701 can cover cavity 285 so that cavity 285 is not visible when rear seat viewing system 450 is in a stowed position. This can provide a finished appearance for top portion 709 of exterior surface 209 when rear seat viewing system 450 is in a stowed position.

Generally, a lid may be attached to an exterior surface in any manner to cover and uncover a cavity within the exterior surface. In some embodiments, a lid may be affixed to an exterior surface by stitching to allow the lid to cover and uncover a cavity. In other embodiments, a lid may attach and release from an exterior surface to cover and uncover a cavity. This can be achieved by any manner known in the art. In a preferred embodiment, a lid can attach to an exterior surface with a hinge that allows the lid to cover and uncover a cavity.

In this embodiment, lid 1701 attaches to exterior surface 209 with hinge 1702. In particular, hinge 1702 is disposed on rearward portion 1785 of top portion 709 adjacent to cavity 285. In other embodiments, hinge 1702 may be disposed in another location proximate to cavity 285. With this arrangement, hinge 1702 attaches lid 1701 to exterior surface 209.

Generally, hinge 1702 may be any type of hinge that allows lid 1701 to cover and uncover cavity 285. In this embodiment, hinge 1702 allows lid 1701 to rotate downward to cover cavity 285. Similarly, hinge 1702 also allows lid 1701 to rotate upward to uncover cavity 285.

Figure 19:
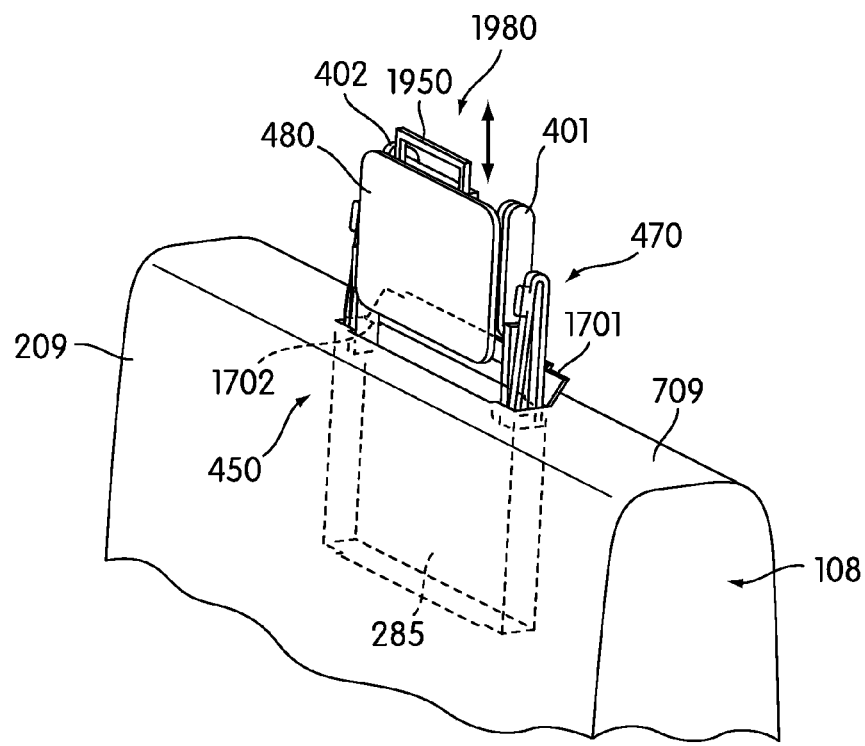
FIG. 19 is an isometric view of a preferred embodiment of a rear seat viewing system adjusting to an employed position.
Figure 20:
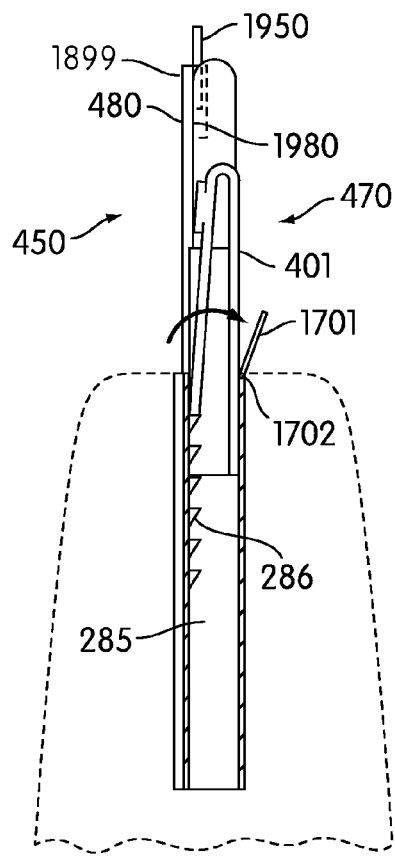
FIG. 20 is a cross sectional view of a preferred embodiment of a rear seat viewing system adjusting to an employed position.

In order to adjust rear seat viewing system 450 to an employed position, lid 1701 may be opened. Referring to FIGS. 19 and 20, an isometric view and a cross sectional view of rear seat viewing system 450, respectively, lid 1701 rotates upward to uncover cavity 285. In particular, lid 1701 uncovers cavity 285 and rotates clear of the vertical space above cavity 285, as illustrated in FIG. 20. With this configuration, lid 1701 does not interfere with the adjustment of rear seat viewing system 450 to an employed position.

A rear seat viewing system may include provisions for facilitating moving a mirror between a stowed and employed position. In the previous embodiment illustrated in FIGS. 6-10, a motor vehicle occupant applies a force directly to a mirror to adjust to a rear seat viewing system to an employed position. In an alternative embodiment, a rear seat viewing system can include a handle to assist in the adjustment to an employed position.

In this embodiment, rear seat viewing system 450 includes handle 1950 to assist in adjusting to an employed position. Handle 1950 may be disposed on any portion of rear seat viewing system 450. In this embodiment, handle 1950 is disposed on rearward surface 1980 of mirror 480.

Generally, handle 1950 may be any type of handle sufficient to adjust rear seat viewing system 450 to an employed position. In some cases, handle 1950 may be a tab that allows a motor vehicle occupant to grasp handle 1950 to adjust rear seat viewing system 450 to an employed position. In other cases, handle 1950 may be a strap. In this case, handle 1950 is configured with a generally rectangular shape. Preferably, the shape of handle 1950 includes sufficient length and width to permit a hand to grip handle 1950 in order to adjust rear seat viewing system 450 to an employed position.

Figure 18:
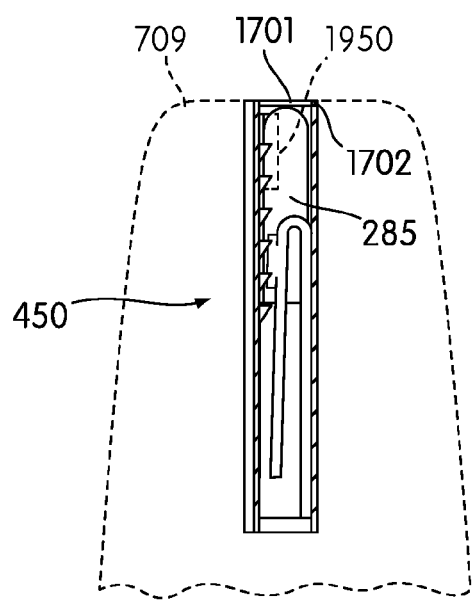
FIG. 18 is a cross sectional view of a preferred embodiment of a rear seat viewing system in a stowed position.

In this preferred embodiment, handle 1950 may be configured to slide upwards against rearward surface 1980 of mirror 480. In particular, when mirror 480 is in a stowed position, handle 1950 may be disposed in a retracted position, as seen in FIG. 18. In this retracted position, handle 1950 may not prevent lid 1701 from closing in the stowed position. However, as lid 1701 is opened, handle 1950 may be pulled upwards until a portion of handle 1950 extends above top edge 1899 of mirror 480, as seen in FIG. 20. In this extended position, handle 1950 may be more easily grasped by a user in order to continue adjusting mirror 480 from a stowed position to an employed position.

In order to adjust rear seat viewing system 450 to an employed position, a motor vehicle occupant may grasp handle 1950 and pull upward. This action preferably moves mirror mounting device 470 upward to a position that disposes mirror 480 outside of exterior surface 209 of rear seat 108. In particular, first base portion 401 and second base portion 402 of mirror mounting device 470 may ascend notches 286 within cavity 285 to adjust mirror 480 to an employed position, as illustrated in FIG. 20. This adjustment can occur in a substantially similar manner as discussed in the previous embodiment illustrated in FIGS. 7-8. Preferably, a motor vehicle occupant may use handle 1950 to adjust mirror mounting device 470 to an adequate vertical position within cavity 285 to dispose mirror 480 outside of exterior surface 209 of rear seat 108 in an employed position.

Figure 21:
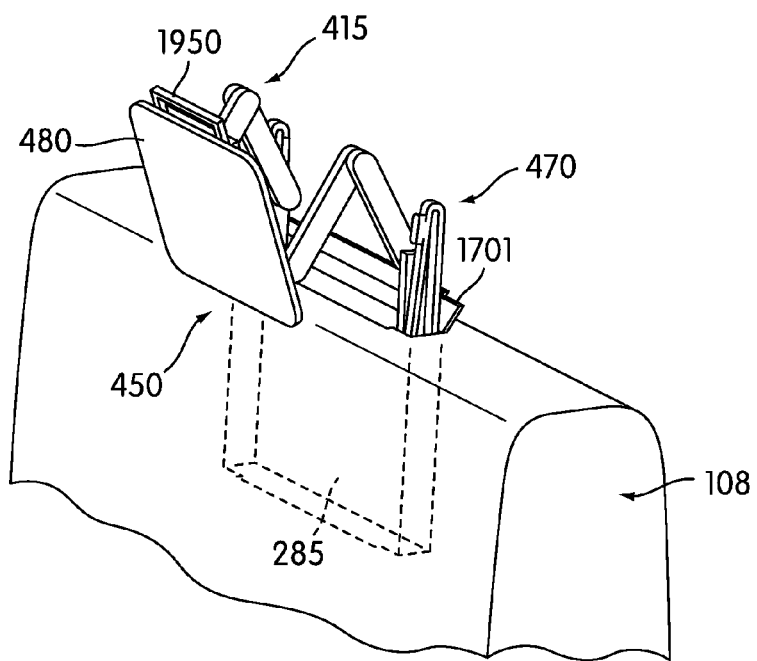
FIG. 21 is an isometric view of a preferred embodiment of a rear seat viewing system in an employed position.
Figure 22:
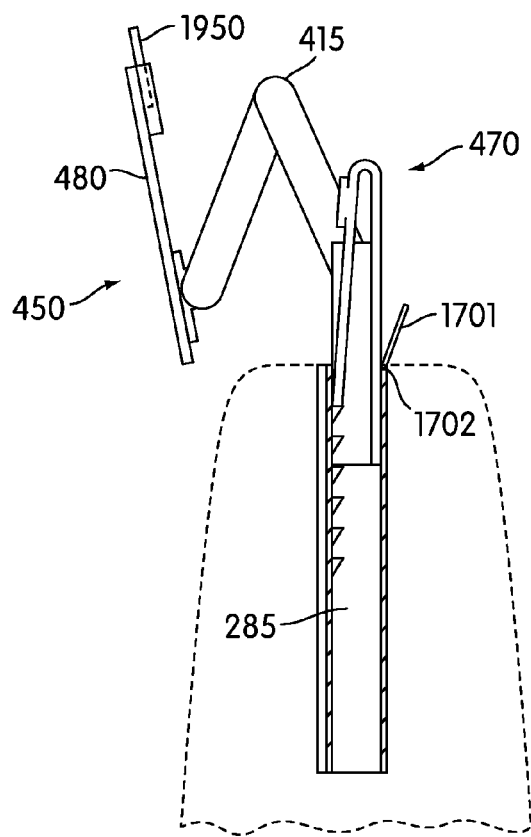
FIG. 22 is a cross sectional view of a preferred embodiment of a rear seat viewing system in an employed position.

In an employed position, mirror 480 may require additional adjustment in a horizontal and/or vertical direction to view an infant within a child restraint system. Referring to FIGS. 21-22, linkage mechanism 415 can be extended to allow horizontal and vertical adjustment of mirror 480 as discussed in the previous embodiment illustrated in FIG. 11. In this embodiment, a user can further adjust mirror 480 in the horizontal and vertical directions using handle 1950. With this configuration, mirror 480 can be adjusted to reflect an image of an infant with a child restraint system for a driver. When mirror 480 is no longer needed, rear seat viewing system 450 can be adjusted to a stowed position in a substantially similar manner as the previous embodiment illustrated in FIGS. 12-13. After rear seat viewing system 450 is adjusted to a stowed position, lid 1701 can be rotated down to cover cavity 285.

Figure 14:
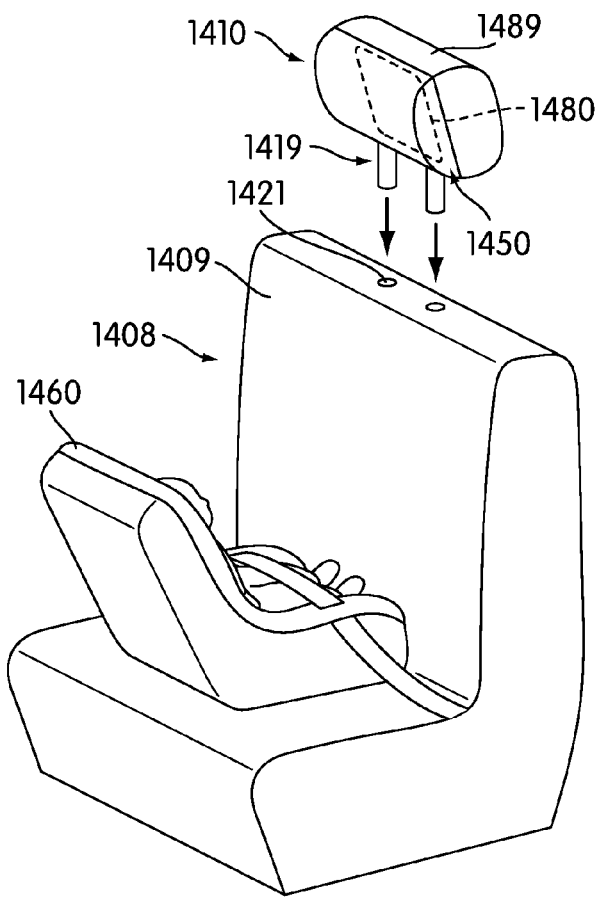
FIG. 14 is an isometric view of a preferred embodiment of a mirror of a rear seat viewing system in a stowed position.
Figure 15:
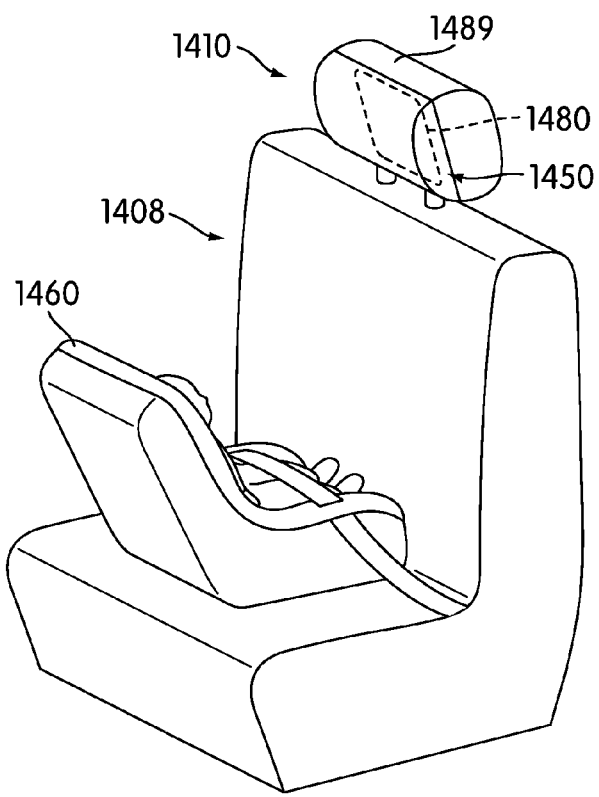
FIG. 15 is an isometric view of a preferred embodiment of a mirror of a rear seat viewing system in a stowed position.
Figure 16:
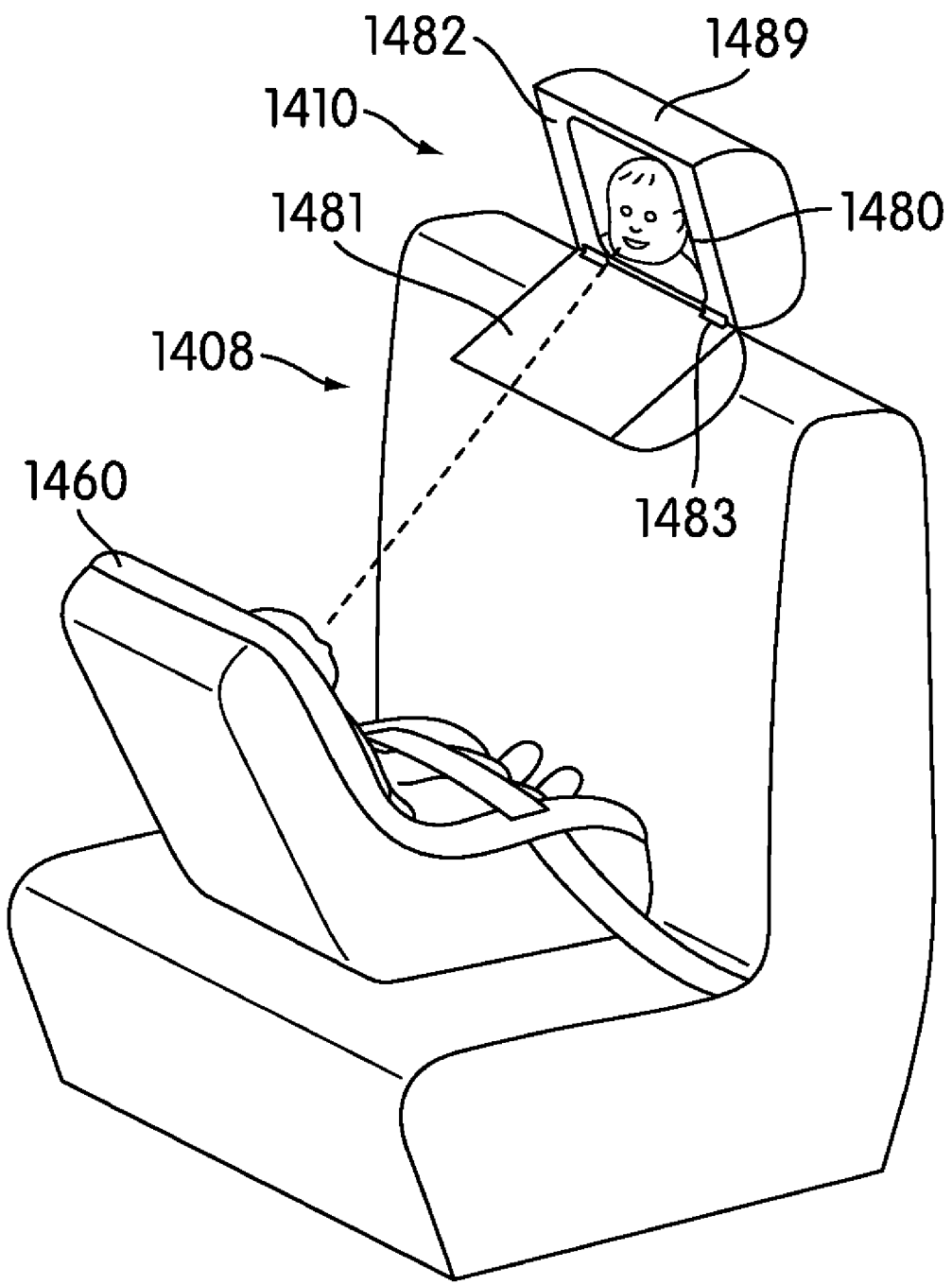
FIG. 16 is an isometric view of a preferred embodiment of a mirror of a rear seat viewing system in an employed position.

In some embodiments, a mirror of a rear seat viewing system may be disposed within a head rest of a rear seat. FIGS. 14-16 illustrate an alternative embodiment of mirror 1480 of rear seat viewing system 1450 configured within head rest 1410. For illustrative purposes, mirror 1480 may be seen in phantom within head rest 1410 in FIGS. 14-15. In this embodiment, head rest 1410 may be associated with rear seat 1408. Rear seat 1408 may be any seat disposed in a rear compartment of a motor vehicle.

In some embodiments, head rest 1410 may be attached to rear seat 1408 in order to provide comfort for a motor vehicle occupant. In the current embodiment, head rest 1410 may be attached to rear seat 1408 in order to view child restraint system 1460 disposed on rear seat 1408.

Generally, head rest 1410 may be attached to rear seat 1408 in any manner known in the art. In this embodiment, head rest 1410 includes prongs 1419. Referring to FIG. 14, prongs 1419 may be inserted into receiving holes 1421 disposed within exterior surface 1409 of rear seat 1408. In this manner, head rest 1410 may be attached to rear seat 1408.

Following the attachment of head rest 1410 to rear seat 1408, mirror 1480 remains disposed within exterior surface 1489 of head rest 1410 as seen in FIG. 15. In other words, mirror 1480 remains in a stowed position within exterior surface 1489 of head rest 1410. This configuration allows head rest 1410 to be used for the comfort of a motor vehicle occupant.

Generally, mirror 1480 may be adjusted to an employed position by manipulating head rest 1410 in some manner. Referring to FIG. 16, head rest 1410 may be opened like a clam shell to adjust mirror 1480 to an employed position. Specifically, mirror 1480 may be mounted by a mirror mounting device not visible in this Figure within exterior surface 1489 on rear portion 1482 of head rest 1410. In order to adjust mirror 1480 to an employed position, a motor vehicle occupant may open head rest 1410 by pulling on front portion 1481 of head rest 1410. Preferably, front portion 1481 is configured to release from rear portion 1482 when a motor vehicle occupant pulls on front portion 1481. As front portion 1481 opens, connection portion 1483 allows front portion 1481 to pivot downward. With this configuration, mirror 1480 may be disposed outside of exterior surface 1489 of head rest 1410 in an employed position. In this employed position, mirror 1480 provides an integrated solution that allows a driver to view an infant or child within child restraint system 1460.

In some cases, a mirror mounting device disposed within a head rest may include a linkage mechanism. As discussed previously, a linkage mechanism may comprise one or more extending portions. Using this arrangement, a mirror disposed within a head rest may be adjusted in a horizontal and vertical direction in order to view an infant or child within a child restraint system.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

I claim:

1. A rear seat viewing system for a motor vehicle, comprising:
    a rear seat including a seat back portion, the seat back portion including an exterior surface, the exterior surface having an upward facing end surface;
    a mirror attached to a mirror mounting device;
    the mirror mounting device being configured to adjust the mirror between a stowed position and an employed position;
    wherein the minor is disposed within the exterior surface of the rear seat back portion in the stowed position and wherein the minor emerges through an opening in the upward facing end surface of the rear seat back portion to attain the employed position;
    the mirror mounting device including a first base portion and a second base portion, each of the base portions including two legs;
    a tab mounted on a first leg of each of the first base portion and the second base portion and configured to allow a user to compress the first leg toward a corresponding second leg; and
    a plurality of notches mounted within the exterior surface of the rear seat back portion and configured to releasably engage the respective first legs of each of the first and second base portions to releasably lock the mirror in the employed position.

2. The rear seat viewing system according to claim 1, wherein the mirror is oriented towards a front compartment of the motor vehicle in the employed position.

3. The rear seat viewing system according to claim 1, wherein the mirror is pivotally attached to the first and second base portions.

4. The rear seat viewing system according to claim 1, wherein the mirror can be adjusted in a vertical direction, and a portion of the mirror can be moved below the upper surface of the seat back portion and into a stowed position by folding a first and a second linkage mechanism next to respective first and second base portions.

5. The rear seat viewing system according to claim 1, wherein the mirror can be adjusted in a horizontal direction.

6. The rear seat viewing system according to claim 1, wherein the notches are defined between triangular teeth that provide a camming surface and a locking surface.

7. A rear seat viewing system for a motor vehicle, comprising:
    a rear seat including a seat back portion, the seat back portion including an exterior surface, the exterior surface having an upward facing end surface;
    a mirror attached to a mirror mounting device, the mirror mounting device being configured to retract the mirror into the rear seat;
    the mirror mounting device including a linkage mechanism;
    the linkage mechanism including a first linkage arm and a second linkage arm;
    the first linkage arm attached to a first side of the mirror and a first base portion that connects the first linkage to the rear seat;
    the second linkage arm attached to a second side of the mirror and a second base portion that connects the second linkage to the rear seat;
    wherein the linkage mechanism provides for horizontal and vertical adjustment of the mirror;
    wherein the mirror is disposed within the exterior surface of the rear seat back portion in the stowed position and wherein the mirror emerges through an opening in the upward facing end surface of the rear seat back portion to attain the employed position;
    the mirror mounting device including a first base portion and a second base portion, each of the base portions including two legs;
    a tab mounted on a first leg of each of the first base portion and the second base portion and configured to allow a user to compress the first leg toward a corresponding second leg; and
    a plurality of notches mounted within the exterior surface of the rear seat back portion and configured to releasably engage the respective first legs of each of the first and second base portions to releasably lock the mirror in the employed position.

8. The rear seat viewing system according to claim 7, wherein the mirror faces in a forward direction that is visible through a rear view mirror.

9. The rear seat viewing system according to claim 7, wherein the linkage mechanism permits horizontal and vertical translation of the mirror relative to the base portion.

10. A rear seat viewing system for a motor vehicle, comprising:
    a rear seat including a seat back portion, the seat back portion including an exterior surface, the exterior surface having an upward facing end surface;
    a mirror attached to a mirror mounting device, the mirror mounting device being configured to retract the mirror into the rear seat;
    wherein the mirror is disposed within the exterior surface of the rear seat back portion in a stowed position and wherein the mirror emerges through an opening in the upward facing end surface of the rear seat back portion to attain an employed position;
    the mirror mounting device including a linkage mechanism, a first base portion and a second base portion, each of the base portions including two legs;
    a tab mounted on a first leg of each of the first base portion and the second base portion and configured to allow a user to compress the first leg toward a corresponding second leg;
    a plurality of notches mounted within the exterior surface of the rear seat back portion and configured to releasably engage the respective first legs of each of the first and second base portions to releasably lock the mirror in the employed position;

wherein the linkage mechanism provides for horizontal and vertical adjustment of the mirror;

wherein the mirror mounting device includes a base portion;

wherein the linkage mechanism attaches the base portion to the mirror; and wherein the minor can pivot with respect to the linkage mechanism.

11. The rear seat viewing system according to claim 10, wherein the linkage mechanism can pivot with respect to the base portion.

12. The rear seat viewing system according to claim 10, wherein the linkage mechanism includes at least one extending portion.

13. The rear seat viewing system according to claim 12, wherein the linkage mechanism includes a first extending portion and a second extending portion and wherein the first extending portion can pivot with respect to the second extending portion.

14. The rear seat viewing system according to claim 10, wherein the linkage mechanism permits horizontal and vertical translation of the mirror relative to the base portion.

15. A rear seat viewing system for a motor vehicle, comprising:

a mirror attached to a mirror mounting device;

a rear seat including a back seat portion with an exterior surface and a cavity that is open on an upwardly facing end surface of the exterior surface of the rear seat;

wherein the mirror mounting device is configured to retract the mirror into the cavity in a stowed position of the mirror;

wherein the mirror is disposed within the exterior surface of the rear seat back portion in the stowed position and wherein the mirror emerges through an opening in the upward facing end surface of the real seat back portion to attain an employed position;

the mirror mounting device including a first base portion and a second base portion, each of the base portions including two legs;

a tab mounted on a first leg of each of the first base portion and the second base portion and configured to allow a user to compress the first leg toward a corresponding second leg; and a plurality of notches mounted within the exterior surface of the rear seat back portion and configured to releasably engage the respective first legs of each of the first and second base portions to releasably lock the mirror in the employed position.

16. The rear seat viewing system according to claim 15, wherein the manual compression of the first leg towards the second leg allows the mirror to be retracted into the cavity.

17. The rear seat viewing system according to claim 15, wherein the mirror mounting device can be configured to automatically retract the mirror into the stowed position.

18. The rear seat viewing system according to claim 15, wherein the mirror mounting device can be configured to automatically extend the mirror to an employed position.

19. The rear seat viewing system according to claim 15, wherein the mirror mounting system is also retracted into the cavity when the mirror is in a stowed position.

20. A rear seat viewing system, comprising:

a rear seat including a seat back portion and a cavity defined inside an exterior surface of the seat back portion the exterior surface having an upward facing end surface;

a mirror mounted within the cavity via first base portion, second base portion and a linkage;

wherein the base portions allow the mirror to be positioned in a stowed position in the cavity and an employed position out of the cavity wherein the mirror emerges through an opening in the upward facing end surface of the rear seat back portion to attain the employed position;

wherein the linkage allows positioning of the mirror in a vertical direction and a horizontal direction when the mirror is in its employed position;

wherein each of the base portions includes two legs;

a tab mounted on a first leg of each of the first base portion and the second base portion and configured to allow a user to compress the first leg toward a corresponding second leg;

a plurality of notches mounted within the exterior surface of the rear seat back portion and configured to releasably engage the respective first legs of each of the first and second base portions to releasably lock the mirror in the employed position.

21. The rear seat viewing system according to claim 20, wherein the linkage includes first and second linkage arms.

22. The rear seat viewing system according to claim 21, wherein the mirror is pivotally attached to the first and second linkage arms.

23. The rear seat viewing system according to claim 21, wherein the first and second linkage arms allow the mirror to be adjusted vertically and horizontally.

24. The rear seat viewing system according to claim 20, wherein the linkage permits horizontal and vertical translation of the mirror relative to the base portion.

* * * * *